United States Patent
Wigren et al.

(10) Patent No.: US 10,547,557 B2
(45) Date of Patent: Jan. 28, 2020

(54) MULTIPOINT DATA FLOW CONTROL

(71) Applicant: TELEFONAKTIEBOLAGET LM ERICSSON (PUBL), Stockholm (SE)

(72) Inventors: Torbjörn Wigren, Uppsala (SE); Linda Brus, Vällingby (SE); Richard Middleton, North Lambton (AU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/556,509

(22) PCT Filed: Mar. 11, 2015

(86) PCT No.: PCT/SE2015/050278
§ 371 (c)(1),
(2) Date: Sep. 7, 2017

(87) PCT Pub. No.: WO2016/144223
PCT Pub. Date: Sep. 15, 2016

(65) Prior Publication Data
US 2018/0054392 A1    Feb. 22, 2018

(51) Int. Cl.
H04L 12/841   (2013.01)
H04W 28/02    (2009.01)
H04L 12/707   (2013.01)
H04L 12/851   (2013.01)
H04W 28/04    (2009.01)

(52) U.S. Cl.
CPC ........... *H04L 47/283* (2013.01); *H04L 45/24* (2013.01); *H04L 47/2441* (2013.01); *H04W 28/0236* (2013.01); *H04W 28/04* (2013.01)

(58) Field of Classification Search
CPC combination set(s) only.
See application file for complete search history.

(56) References Cited

U.S. PATENT DOCUMENTS 6,680,955 B1 *  1/2004  Le .................. H04L 29/06
                                              370/477
9,100,330 B1 *  8/2015  Noveck ............. H04L 47/283
                        (Continued)

FOREIGN PATENT DOCUMENTS

WO    2012064772 A1   5/2012
WO    2013023836 A1   2/2013
                      (Continued)

*Primary Examiner* — Khaled M Kassim
*Assistant Examiner* — Syed Ali
(74) *Attorney, Agent, or Firm* — Sage Patent Group

(57) ABSTRACT

A method for multipoint data flow control, performed in a controller entity of a wireless communication system, comprises receiving of a data flow from a source flow queue. The data flow is split into split data flows, one for each of at least two wireless transmission points. Measures of timing skews for transmissions or quantities from which such timing skews can be deduced are received from each of the at least two transmission points. The data flow splitting is controlled in dependence of the timing skews. The split data flows are transmitted to the at least two wireless transmission points. A method for assisting in multipoint data flow control, network nodes configured for multipoint data flow control and assisting in multipoint data flow control, and computer programs therefore are also disclosed.

7 Claims, 11 Drawing Sheets

(56) References Cited

U.S. PATENT DOCUMENTS

| | | | | |
|---|---|---|---|---|
| 2006/0039380 A1* | 2/2006 | Cloonan | .............. | H04L 49/90 |
| | | | | 370/395.4 |
| 2012/0300664 A1* | 11/2012 | Hong | .............. | H04L 43/0894 |
| | | | | 370/252 |
| 2013/0114748 A1* | 5/2013 | Kubota | .............. | H04L 1/188 |
| | | | | 375/259 |
| 2013/0159724 A1* | 6/2013 | Kim | .............. | H04L 9/0844 |
| | | | | 713/181 |
| 2014/0369329 A1 | 12/2014 | Lee et al. | | |
| 2015/0071281 A1* | 3/2015 | Shiotani | .............. | H04L 47/28 |
| | | | | 370/350 |
| 2015/0172197 A1* | 6/2015 | Sun | .............. | H04L 47/32 |
| | | | | 370/389 |
| 2017/0317717 A1* | 11/2017 | Trojer | .............. | H04B 3/46 |
| 2019/0230555 A1* | 7/2019 | Wigren | .............. | H04L 5/0035 |

FOREIGN PATENT DOCUMENTS

| | | | | |
|---|---|---|---|---|
| WO | 2013167647 A1 | 11/2013 | | |
| WO | WO-2013167647 A1 * | 11/2013 | ........ | H04W 28/0247 |

\* cited by examiner

MULTIPOINT DATA FLOW CONTROL

This application is a 371 of International Application No. PCT/SE2015/050278, filed Mar. 11, 2015, the disclosure of which is fully incorporated herein by reference.

TECHNICAL FIELD

The proposed technology generally relates to methods and devices for multipoint data flow control, and in particular to methods and devices for multipoint data flow control based on measured time quantities at a multitude of transmission points.

BACKGROUND

Today's wireless cellular systems have been designed to handle very efficient data transfer between a single user, or rather a single User Equipment (UE), and a single Evolved universal terrestrial radio access network Node (eNB). These solutions are sufficient at today's carrier frequencies close to 1-2 GHz. In future fifth generation cellular system (5G) a shift towards higher carrier frequencies is a necessity, to be able to utilize the available spectrum, thereby achieving a higher capacity overall.

A consequence of the move to higher carrier frequencies is that the radio propagation is transformed from "diffuse" scattering to beamlike propagation. This leads to sharp diffraction effects and increasingly heavy radio shadowing behind obstacles. This makes it more difficult to obtain uniform coverage from a single eNB. The implication is a need to transmit from multiple, non-co-located, transmit points to cover a single cell. Such massive multi-point transmission is generally considered to become a cornerstone in future 5G radio access.

It should be noted that multi-point transmission is also considered for the present fourth generation cellular system (4G) Long-Term Evolution (LTE) system, however, the need and also the massiveness of the solutions for 4G are believed to be less than those of future 5G cellular systems. Also third generation cellular system (3G) multi-point transmission systems are feasible.

In a multi-point system, and in particular in a massive multi-point transmission system, all transmit points need to have access to timely data to transmit at every point in time and in many applications that data is closely related to data simultaneously being transmitted from other transmit points. This is e.g. the case for streaming video, in which case the data for a specific part of the video are needed at the same time in the receiving UE. It should be noted here that the different transmit points may transmit different data, or the same data for diversity gain, or a mix of these alternatives.

One mechanism for achieving multi-point transmission is illustrated in FIG. 1. That particular figure depicts an architecture of the 3G Wideband Code-Division Multiple Access (WCDMA) system. Similar architectures in 4G and 5G would involve nodes from both the Radio Access Network (RAN) and the Core Network (CN). FIG. 1 illustrates multipoint data flow, where splitting and recombination of a single flow via multiple flows at the physical layer is performed. A Radio Network Controller (RNC) 10 comprises a flow splitter 12, which splits a data flow 9 that is incoming to the RNC 10 into split data flows 13. The split data flows are provided to different transmission points 39, in this figure represented by a multitude of Radio Base Stations (RBS) 30:1, 30:2, . . . , 30:n. The split data flows are transmitted to a UE 20, in which the received split data flows 23 are recombined in a flow recombiner 22.

One key issue that may arise, particularly in heterogeneous multiflow systems, relates to synchronization of received data. Data, received by the flow splitter 12, will in the best case be an ordered set of packets that needs to be transmitted to the UE 20. However, due to non-uniform delays in the individual flows, the packets received by the UE 20 will in general be out of order. These delay variations may be the result of varying queuing delays in the RBS, varying transport network delays, e.g. due to congestion, and/or varying radio link quality, causing RBS buffer size variation.

Small timing errors between packets that are received are automatically handled by the Transmission Control Protocol (TCP) protocol which reorders the packets to resynchronize and create the correct data sequence. However, if the asynchronism is too large in comparison with the buffering capacity, TCP will register this as an error, and request retransmission of several packets. In some implementations of TCP, this may cause retransmission of out of sequence packets already received, as well as packets still in flight. This will then affect the user experience in a negative way, causing e.g. the streaming video to display erroneously.

There is therefore a need for an improvement of multipoint transmission, in terms of both capacity and user experience.

SUMMARY

It is an object to provide multi-point transmission having improved efficiency and giving a smoother data transfer.

This and other objectives are met by embodiments of the proposed technology. In general words, in a first aspect, a method for multipoint data flow control, performed in a controller entity of a wireless communication system, comprises receiving a data flow from a source flow queue. The data flow is split into split data flows, one for each of at least two wireless transmission points. Measures of timing skews for transmissions or quantities from which such timing skews can be deduced are received from each of the at least two transmission points. The data flow splitting is controlled in dependence of the timing skews. The split data flows are transmitted to the at least two wireless transmission points.

In a second aspect, a method, performed in a controlled entity of a wireless communication system, wherein the controlled entity is associated with at least one wireless transmission point, comprises measuring of a total downlink delay for each of the at least one wireless transmission point. The downlink delay comprises a network downlink delay from a controller entity and a queue delay for each of the at least one wireless transmission point. The total downlink delay or quantities derivable therefrom are transmitted directly or indirectly to a controller entity to assist in multipoint data flow control by the controller entity.

In a third aspect, a network node is configured to control multipoint data flow in a wireless communication system. The network node is thereby configured to receive a data flow from a source flow queue. The network node is further configured to split the data flow into split data flows, for each of at least two wireless transmission points. The network node is further configured to receive measures of timing skews for transmissions from each of the at least two transmission points or quantities from which the timing skews can be deduced. The network node is further configured to control the splitting in dependence of the timing skews. The network node is further configured to transmit the split data flows to the at least two wireless transmission points.

In a fourth aspect a network node is configured to assist in controlling multipoint data flow in a wireless communication system. The network node is thereby configured to measure a total downlink delay for each of at least one wireless transmission point. The downlink delay comprises a network downlink delay from a controller entity and a queue delay for each of the at least one wireless transmission point. The network node is further configured to transmit the total downlink delay or quantities dependent thereon directly or indirectly to a controller entity to assist in multipoint data flow control by the controller entity.

In a fifth aspect, a computer program comprises instructions, which when executed by at least one processor, cause the processor(s) to receive a data flow from a source flow queue. The computer program comprises further instructions, which when executed by the processor(s), cause the processor(s) to split the data flow into split data flows, for each of at least two wireless transmission points. The computer program comprises further instructions, which when executed by the processor(s), cause the processor(s) to receive measures of timing skews for transmissions from each of the at least two transmission points or quantities from which the timing skews can be deduced. The computer program comprises further instructions, which when executed by the processor(s), cause the processor(s) to control the splitting in dependence of the timing skews. The computer program comprises further instructions, which when executed by the processor(s), cause the processor(s) to transmit the split data flows to the at least two wireless transmission points.

In a sixth aspect, a computer program comprises instructions, which when executed by at least one processor, cause the processor(s) to measure a total downlink delay for each of at least one wireless transmission point. The downlink delay comprises a network downlink delay from a controller entity and a queue delay for each of the at least one wireless transmission point. The computer program comprises further instructions, which when executed by the processor(s), cause the processor(s) to transmit the total downlink delay or quantities dependent thereon directly or indirectly to a controller entity to assist in multipoint data flow control by the controller entity.

In a seventh aspect, a carrier comprises at least one of the computer programs of the fifth and sixth aspect, respectively. The carrier is one of an electronic signal, an optical signal, an electromagnetic signal, a magnetic signal, an electric signal, a radio signal, a microwave signal, or a computer-readable storage medium.

In an eighth aspect, a network node for multipoint data flow control in a wireless communication system comprises a first receiver for receiving a data flow from a source flow queue. The network node further comprises a splitting module for splitting the data flow into split data flows, for each of at least two wireless transmission points. The network node further comprises a second receiver for receiving measures of timing skews for transmissions from each of the at least two transmission points or quantities from which the timing skews can be deduced. The network node further comprises a controller for controlling the splitting in dependence of the timing skews. The network node further comprises a transmitter for transmitting the split data flows to the at least two wireless transmission points.

In a ninth aspect, a network node for multipoint data flow control in a wireless communication system comprises a measuring module for measuring a total downlink delay for each of at least one wireless transmission point. The downlink delay comprises a network downlink delay from a controller entity and a queue delay for each of the at least one wireless transmission point. The network node further comprises a transmitter for transmitting the total downlink delay or quantities dependent thereon directly or indirectly to a controller entity to assist in multipoint data flow control by the controller entity.

An advantage of the proposed technology is that the capacity in multi-point transmission scenarios is significantly enhanced. Furthermore, the user experience is improved by creating a more smooth data transfer. The need for buffering in the UEs is also reduced.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

The examples and embodiments in the present disclosure are described utilizing the nomenclature of the fourth generation cellular systems (4G), using e.g. eNB as the acronym for a base station node. It is understood that the nomenclature may change in the future, when the fifth generation cellular systems (5G) is introduced. However, corresponding network nodes will still be present and the presently presented technology will be applicable also to many upcoming 5G systems. The presently presented technology is also applicable to other types of wireless communication systems and is not limited only to cellular systems.

Figure 1:
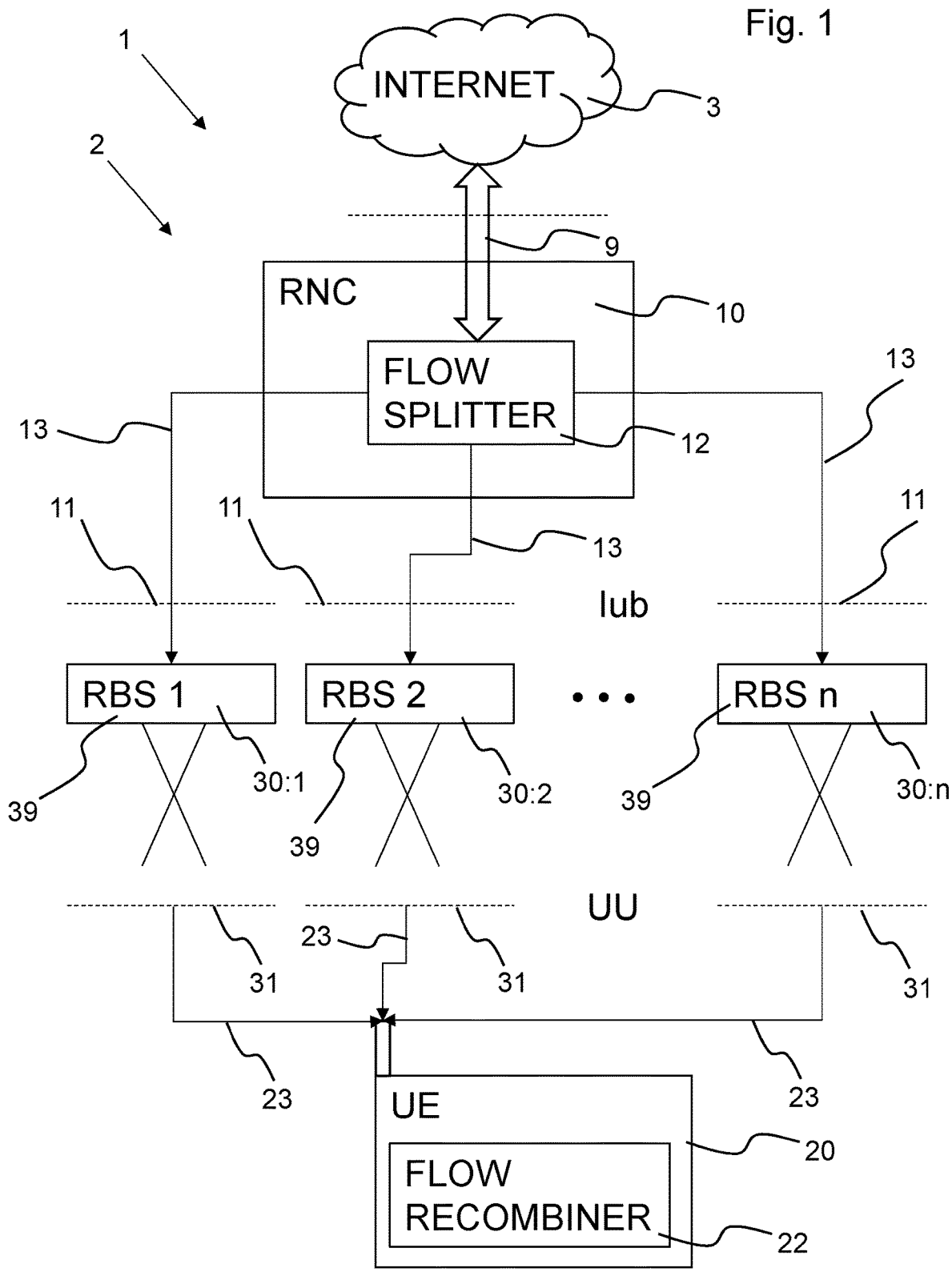
FIG. 1 is a schematic illustration of an embodiment of a wireless communication system with multipoint data flow control.

For a better understanding of the proposed technology, it may be useful to begin with a brief overview of an architecture of a 3G WCDMA system, as depicted in FIG. 1. FIG. 1 generally illustrates a wireless communication system 1, in this example a cellular communication system 2, and in this particular figure, a WCDMA system. A data flow 9 is transmitted from an external source, such as the Internet 3, to a flow splitter 12 in a RNC 10. The flow splitter 12 divides or splits the data 9 into split data flows 13, which are transmitted over an Iub interface 11 to a number of transmission points 39, in this example RBSs 30:1-30:n. The split data flows 13 are transmitted over an UU interface 31 to a UE 20. In the UE 20 the received split data flows 23 transmitted from each transmission point 39 are recombined in a flow recombiner 22. The present disclosed novel ideas mainly concerns methods and devices at the network side of the UU interface 31.

Figure 2:
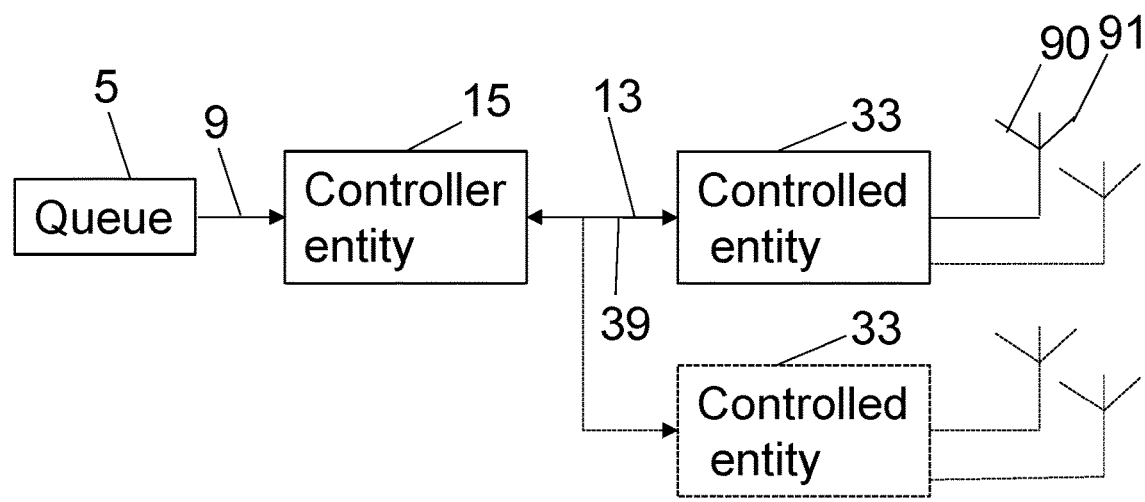
FIG. 2 is a schematic illustration of an embodiment of logical connections within a multipoint flow system.

In order to improve the efficiency of the downlink data transmission, knowledge of the delay times within the system can be of benefit for the entity responsible for the splitting of the downlink data stream. A schematic illustration of logical connections within a multipoint data flow system is shown in FIG. 2. A source flow queue 5 holds packets of a data stream. The incoming data stream (not shown) can e.g. be provided from Internet. A data flow 9 is provided to a controller entity 15, which is responsible for e.g. splitting the data flow 9 into split data flows 13 intended for different transmission points. The split data flows 13 are received by one or several controlled entities 33. The controlled entities 33 are controlled in that sense that the controller entity 15 decides what split data flow is provided and in which pace to each controlled entity 33. The controlled entities handles the preparation for radio transmission of the respective split data flows 13 and provides signals to be transmitted from different wireless transmission points 90, in this illustration illustrated by antennas 91. One controlled entity 33 can be responsible for one or several wireless transmission points 90. In order to achieve a more efficient utilization of the downlink capacity, it is of benefit to bring back timing information 39, in particular measures of timing skews for transmissions from each of the transmission points or quantities from which such timing skews can be deduced, from the controlled entities 33 to the controller entity. As will be discussed more in detail further below, the controller entity and the controlled entities can be provided in a common network node or in different network nodes in many different configurations.

Figure 3:
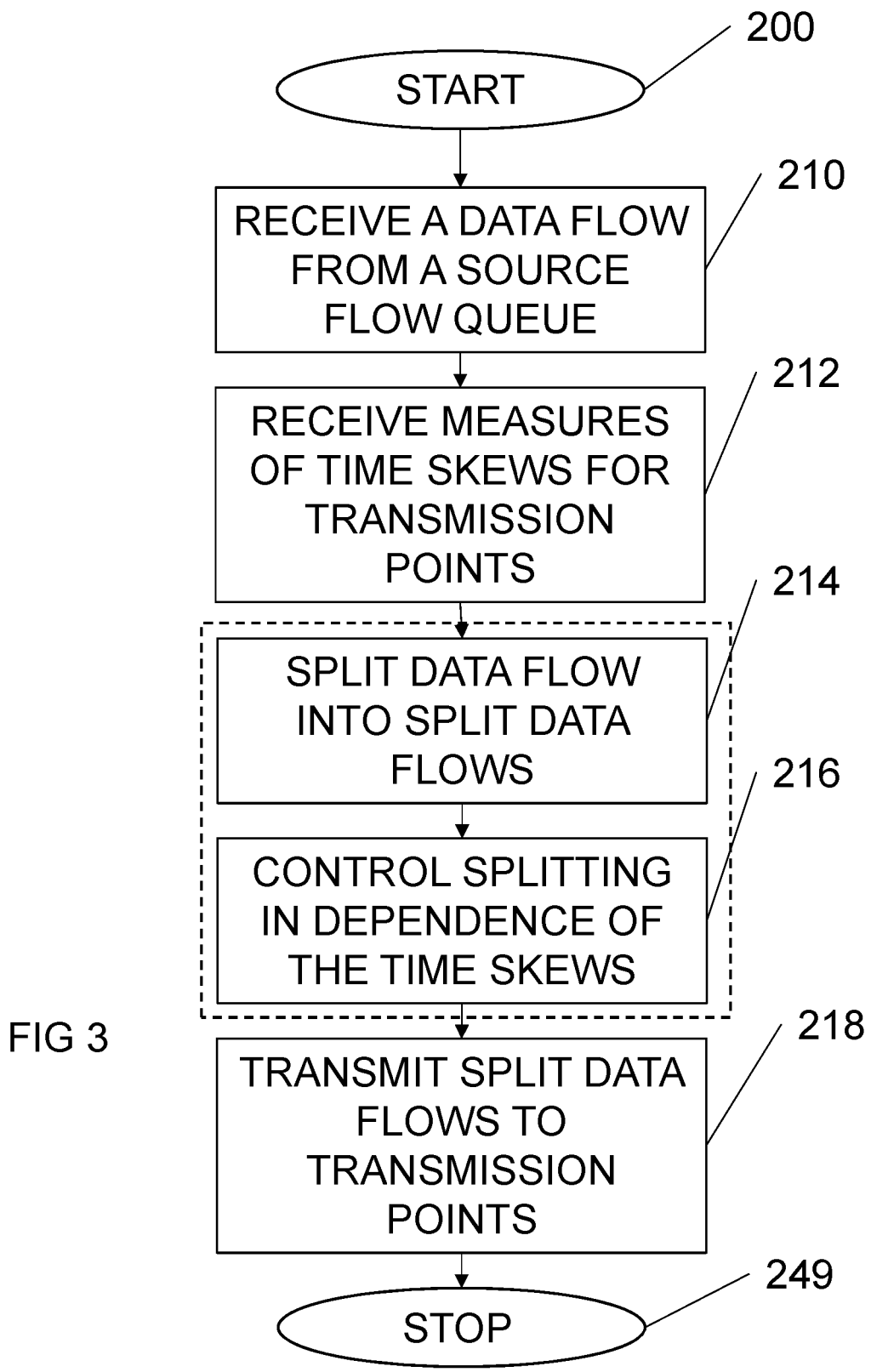
FIG. 3 is a flow diagram of steps of an embodiment of a method for multipoint data flow control.

From the controller entity point of view, measures associated with timing skews for the different transmission points, achieved from the controlled entities, are used for providing an improved splitting of the data flow. In FIG. 3, a flow diagram of steps of an embodiment of a method intended to be performed in a controller entity of a wireless communication system is illustrated. The method for multipoint data flow control starts in step 200. In step 210, a data flow is received from a source flow queue. In step 212, measures of timing skews for transmissions from each of at least two wireless transmission points or quantities from which the timing skews can be deduced are received. Examples of such quantities from which the timing skews can be deduced are average total delay for the wireless transmission points and individual total delay for each of the wireless transmission points, and/or queuing delays and network downlink delays for each of the wireless transmission points. This is discussed more in detail further below. In step 214, the data flow is split into split data flows, for each of the at least two wireless transmission points. In step 216, the splitting is controlled in dependence of the timing skews that are received or that can be deduced from the received quantities. The steps 214 and 216 are typically performed in combination as one combined step, as indicated by the broken box in FIG. 3. The split data flows are in step 218 transmitted to the wireless transmission points. The procedure ends in step 249. Even though the FIG. 3 is illustrated as a one single flow, the steps may be performed in different order or simultaneous, treating the same or different sets of data. Timing skews measured for one set of data is thereby used for assisting in controlling a split of subsequently transmitted data.

Figure 4:
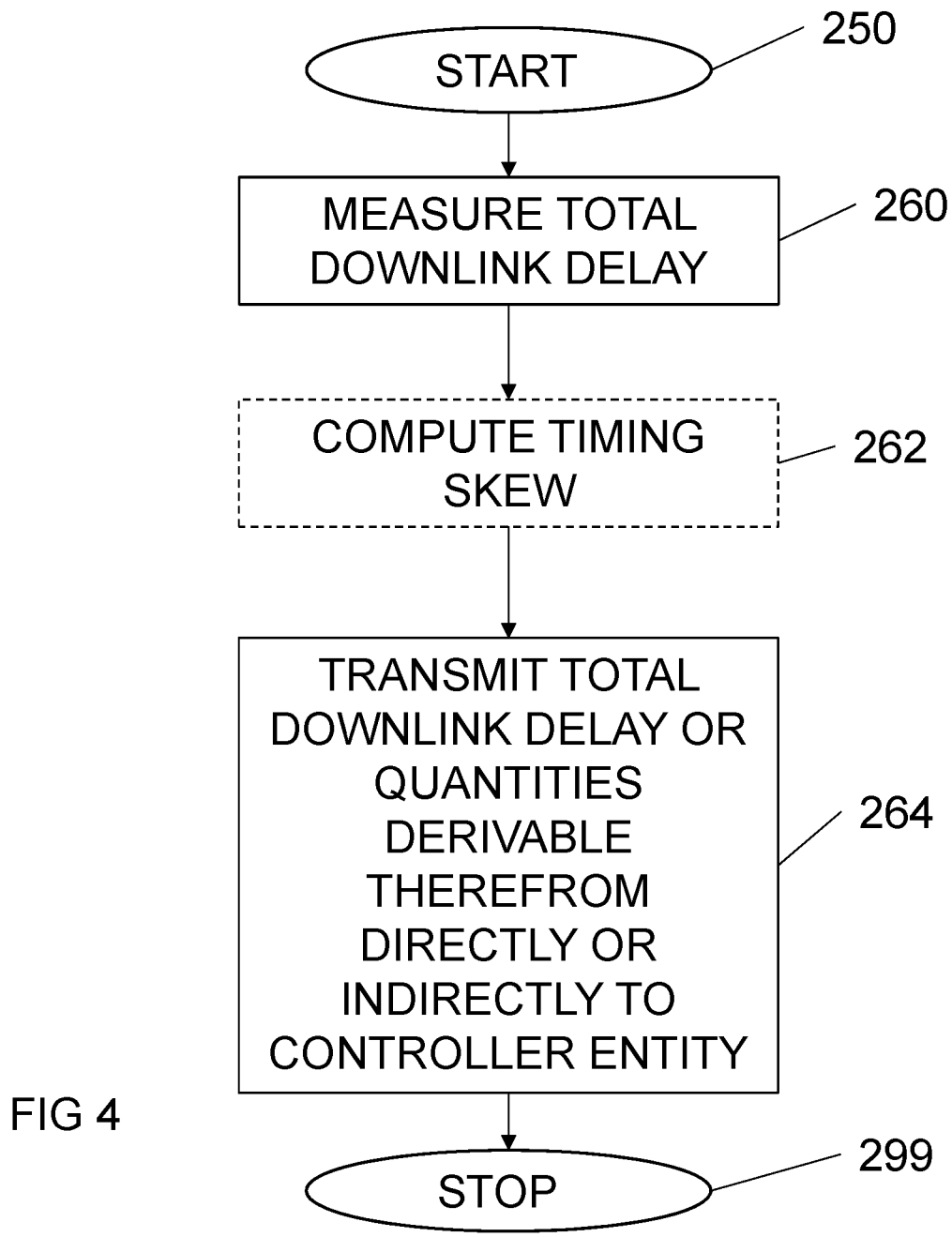
FIG. 4 is a flow diagram of steps of an embodiment of a method for assisting in multipoint data flow control.

From the controlled entity point of view, timing skews are measured for the different transmission points associated with the controlled entity in question, and the results are transmitted uplinks to the controller entity to assist in providing an improved splitting of the data flow. In FIG. 4, a flow diagram of steps of an embodiment of a method intended to be performed in a controlled entity of a wireless communication system is illustrated, which controlled entity is associated with at least one wireless transmission point. The method for assisting in multipoint data flow control starts in step 250. In step 260, a total downlink delay for each of the wireless transmission points being associated with the controlled entity in question are measured. The total downlink delay comprises a network downlink delay from a controller entity and a queue delay for each of the wireless transmission points. In step 264, the total downlink delay or quantities derivable therefrom are transmitted directly or indirectly to the controller entity. The so provided total downlink delay or quantities derivable therefrom are thereby provided to assist in multipoint data flow control performed by the controller entity. The procedure ends in step 299.

Since the quantity, on which the control in the controller entity is performed, is the timing skew, such a measure has to be calculated at some point from the controlled entity to the controller entity. If, in a particular embodiment, the controlled entity has access to the average total delay for the wireless transmission points being controlled by the controller entity, the timing skew can be calculated in step 262. The average total delay can be provided from another entity. Alternatively, total downlink delays for all other controller entities being associated with the transmission points that are controlled by the controller entity can be received and an average can be calculated. When an average total delay is known, preferably, only the timing skew is transmitted to the controller entity as a quantity derivable from the total downlink delay.

If, in another embodiment, the controlled entity does not have access to the average total delay, the total downlink delay can be provided to the controller entity as a quantity from which the timing skew can be deduced. Alternatively, the total downlink delay can be provided to another entity, e.g. another controlled entity, in which all total downlink delays for all controller entities being associated with the transmission points that are controlled by the controller entity are collected and an average can be calculated. This average total delay can be transmitted back to the controlled entity, as described in the embodiment above. Alternatively, timing skews corresponding to all transmission points can be calculated and transmitted to the controller entity.

Figure 5:
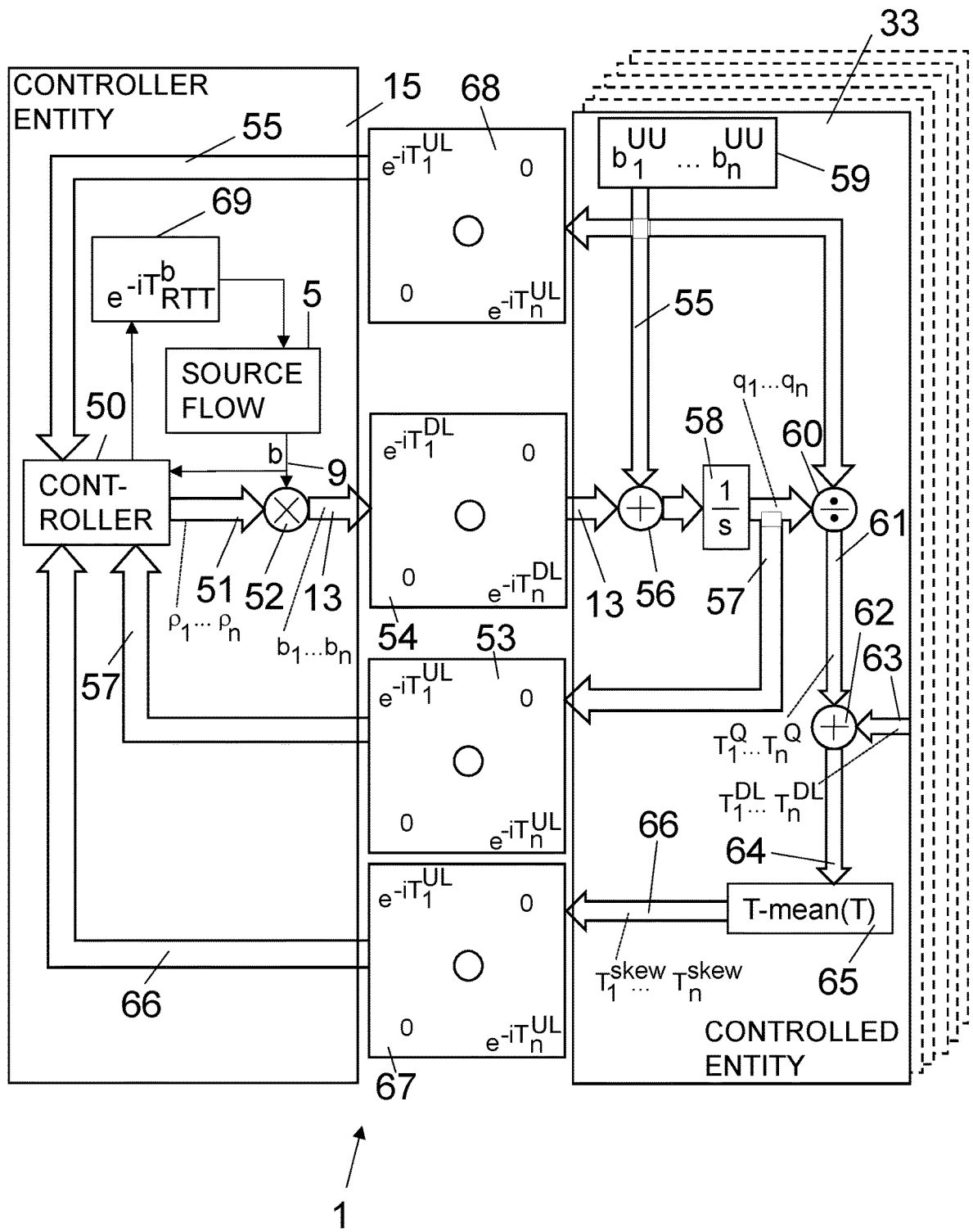
FIG. 5 illustrates an embodiment of data flows in the wireless communication system.

Timing skews have been found to be of interest to use for controlling purposes and FIG. 5 depicts an embodiment of data flows in the wireless communication system 1. The following list describes the symbols used in the figure:
  b is the source flow [bits/s];
  T denotes time delays [s];
  $T_{RTT}^b$ is a round trip delay from packet corruption to NACK receipt at source [s];
  $\rho_i$ are the splits for the flow [dimensionless];
  $b_i$ are the individual flows that form the multi-flow [bits/s];
  $q_i$ are the queue lengths at the controlled entity [bits];
  $b_{pi}$ are the service bitrates (downlink) for the different radio channels [bits/s];
  $T_i^Q$ are the queuing delays [s];
  $T_i^{DL}$ are the delays on the downlink transmission [s];
  $T_i^{skew}$ are the timing skew in packet arrivals [s].

$T_{RTT}^b$ is in other words the delay experienced by the standard TCP-IP flow control. $\rho_i$ must sum to unity. The timing skew is defined as the difference between a total time delay and a mean of total time delays for all transmission points in the system. This timing skew is also often referred to as timing errors.

The controller entity 15 comprises a controller 50. The controller 50 resides typically at least partly as a sub-block in a network node such as an eNB. Parts of the controller 50 may possibly also be located in other network nodes, typically Core Network (CN) nodes. Dynamic and static properties of the controller 50 are determined from information provided from the controlled entity 33 side of FIG. 5. This is what is commonly known as model based control. In essence that means that a dynamic model is built of the whole control system, including delays, queue, measurements and actuators. The mathematical rules applied by the controller 50 are then computed from the model of the control system. The result is a controller 50 that processes the available measurements in a way that is consistent with the assumed dynamic properties of the control system. In other words, the dynamics of the controller 50 becomes tuned to the assumed operation of the model. This clearly shows why the model is of central importance, at least for this embodiment.

The model of the control system can e.g. be described by a nonlinear state space model as:

$$x(t+T)=f(x(t),u(t),w(t))$$

$$y(t)=g(x(t),u(t),e(t))$$

where x(t) is the state vector, u(t) is the control signal vector, i.e. the output from the controller, w(t) are disturbances, parts of those being measurable, y(t) is the output signal vector and e(t) is the measurement disturbance vector.

In FIG. 3, the measurements that are processed by the controller include the measurements of skew $T_i^{skew}$, the queue lengths $q_i$, and the bitrates of the air interface transmissions $b_i^{uu}$. A suitable subset of these would be parts of the output measurement vector y(t) of the above state space model. It should now be clear that all thick arrows of FIG. 5 may represent multiple signal channels, and that one or several controlled entities, illustrated by broken lines, are involved. Based on y(t) the selected control algorithm, discussed further below, is used to compute the control signal vector u(t), in this case consisting of the splits for the flows $\rho_i$, and the total source data flow b, 9. The queue 5 of the source data flow b, 9, is affected by the underlying internet protocol (TCP/IP) and is not primarily in a most general embodiment considered a part of the flow controller. The effect of TCP/IP is mainly to control the size of the queue 5 that feeds the source data flow b.

The splits $\rho_i$, 51, for the flows, control the multiplications of the splitting block 52 following the controller 50 to divide the data flow 9 into the split data flows $b_i$, 13, to the different transmission points. This creates commanded bitrates forming the individual split data flows $b_i$, 13. These split data flows $b_i$ are subject to the (multiple) transport DL delay block 54, where the exponentials express the effect of the delay in the Laplace transform domain, which is common practice in automatic control design.

The individual split data flows 13 then reach the summation points 56 where the service bitrates $b_i^{uu}$, 55, represent the outflow of bits from the queues, which in turn are represented by (multiple) integrators 58. The integrators 58 are expressed by the Laplace transform 1/s as is common practice, and each queue is represented by the number of bits in the queue $q_i$, 57.

The $q_i$ then follow two paths. One path represents the feedback back to the controller 50, again subject to (multiple) delays represented by the block 53 of Laplace exponentials The other path goes to the division block 60 where $T_i^Q = q_i/b_i^{uu}$ are computed. These queuing delays 61 represent the actual control objective. The reason why this is the control objective is that i) services, ii) the performance of TCP/IP are both sensitive to delay. At the same time the actual delays are not used for queue feedback, rather the number of bits in the queue, $q^i$, are used. The reason for this is that the division above would result in a time variable feedback control system for which the vast amount of linear time invariant controller design methods would not apply. A time varying feedback is therefore much more difficult to design. This principle is denoted time invariant embedding.

The corresponding downlink delay 63 is then in an addition block 62 added to each $T_i^Q$, resulting in a total downlink delay 64. Following this step, an average over all indices are computed to give the average downlink delay mean (T)=mean($T_j^Q + T_j^{DL}$, j=1 ... n). This is the used, in a skew computing block 65, to compute the skew 66 of each channel as:

$$T_i^{skew} = T_i - \text{mean}(T) = T_i^Q + T_i^{DL} - \text{mean}(T_j^Q + T_j^{DL}, j=1 \ldots n).$$

The usefulness of this measurement stems from the fact that it represents the time miss-alignment of data packets sent from different transmission points.

Finally the measured skews 66 are fed back to the controller, subject to the uplink delay block 67.

One part of FIG. 5 remains to be discussed and this is the measurement 59 of the serving rates $b_i^{uu}$, 55, that are sent to the controller 50 via the uplink delay block 68. This information cannot be affected by the controller 50 and the information does therefore not represent a feedback. Rather the signaling of the measureable disturbances $b_i^{uu}$, 55, is denoted feed-forward in the common practice of automatic control.

In summary FIG. 5 thus shows that the controller 50 makes use of two kinds of feedback information ($q_i$ and $T_i^{skew}$), and one kind of feed-forward information ($b_i^{uu}$).

Timing skew may be controlled via a variety of actuator mechanisms, which lead to control of the split pi of data. The actuator mechanism may e.g. include:
  Reducing the amount of data sent on channel with high (positive) timing skew.
  Adding a small delay to packets sent on channels with low (negative) timing skew.
  Increasing QoS or priority for packets sent on channels with high (positive) timing skew.

Reducing QoS or priority for packets sent on channels with low (negative) timing skew.

The overall controlling of the split of the data flow is in one embodiment performed for minimizing an average absolute value of timing skew. Such an approach maximizes in some sense the overall experienced quality.

The overall controlling of the split of the data flow is in another embodiment performed for keeping all individual timing skews within predetermined limits. This can be interesting in systems where delay differences below a certain threshold cannot be experienced by the users, and the extra degree of freedom can be spent on efforts to bring more transmission point delays below that threshold.

It remains to briefly discuss the computation of the control signal. Here many methods are available in the open literature. Suitable methods need to recognize the facts that the control problem is multiple-input-multiple-output (MIMO), normally with multiple control signals and measurement signals. The control problem is also a combined feedback/feed-forward problem. A third characterizing feature is that the problem is likely to require non-linear methods for its solution. This follows since the data split enters non-linearly in the model depicted in FIG. 5. It may however be the case that the control system can be linearized, in which case normal design methods for linear time invariant control could be applied.

Given the above constraints a number of alternative strategies seem possible. For nonlinear control, state space based methods like non-linear model predictive control is a possible choice. These methods can be applied and tuned to most non-linear models. There is a vast literature on model predictive control in the open literature.

Linearization followed by MIMO linear feedback/feed-forward control is another alternative. The linearization could be performed by a number of methods available in the open literature, including feedback linearization, gain scheduling and conventional differential linearization. There is also a vast literature on linear MIMO control, covering e.g. frequency domain loop-shaping, robust control and linear quadratic Gaussian control.

Robust linear MIMO control, without performing linearization can be based on Multiple single-input-single-output control (SISO), applied to each channel (index i) independently. Here all alternatives above apply with MIMO replaced by SISO.

The strategies above in general can be expected to become increasingly more simple and easy to implement. They all result in the computation of at least one control signal u.

In a particular embodiment, also control of the queue 5 of the source data flow b, 9, can be affected by the controller 50, as indicated by total bit rate block 69. This control is preferably based on the queue lengths and bitrates of air interface transmissions. Thus, in embodiments, where the controller entity 15 receives measures of queue lengths and bitrates of air interface transmissions for at least one of the wireless transmission points, the data flow 9 from the source flow queue 5 can be controlled based on at least the queue lengths and the bitrates of air interface transmissions.

At the controlled entity side, queue lengths and bitrates of air interface transmissions for the wireless transmission points of the controlled entity are measured. These queue lengths and bitrates or quantities dependent thereon are directly or indirectly transmitted to the controller entity. In one embodiment, the queue lengths and bitrates are themselves transmitted directly or indirectly to the controller entity. In another embodiment, the controlled entity calculates a queue time from the queue lengths and bitrates for the wireless transmission points. This queue time is then transmitted directly or indirectly to the controller entity as quantities dependent on the queue lengths and bitrates.

As for the architecture, the delay blocks 53, 54, 67 and 68 can be understood to represent interfaces/transport channels between the physical location of the queues and measurements, and the controller, i.e. between the controller entity 15 and the controlled entities 33. The interfaces/channels may be between two nodes, typically one eNB and another network node. The interfaces/channel may also be internal to one single node, with the controller, queues and measurements implemented in this single node.

Figure 6:
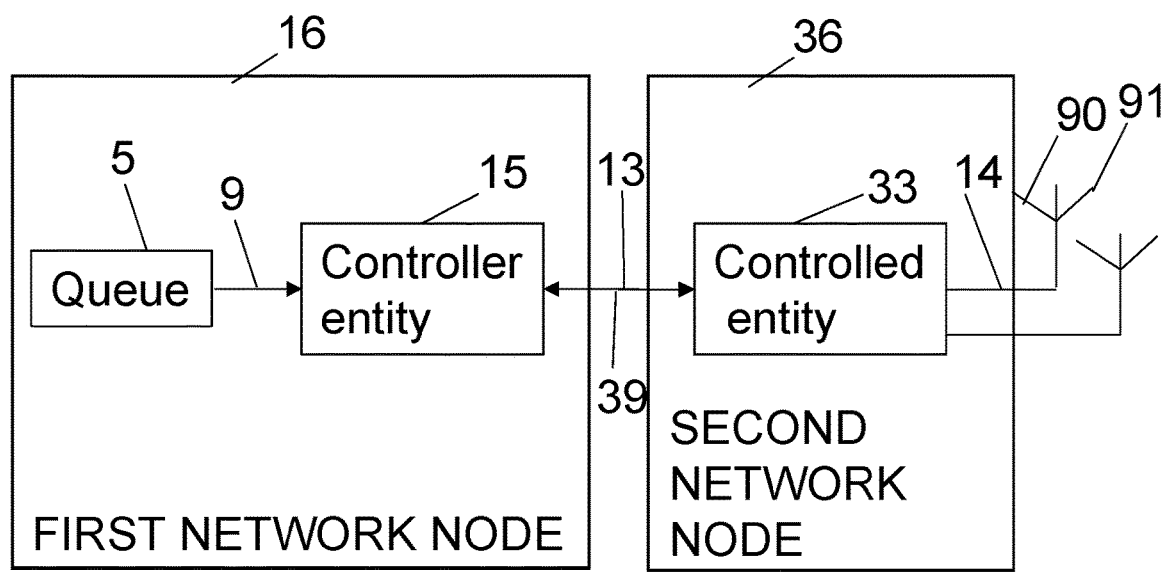
FIG. 6 illustrates schematically an embodiment of a wireless communication multipoint flow system.

FIG. 6 illustrates schematically an embodiment of a wireless communication multipoint data flow system. In this embodiment the controller entity 15 is comprised in a first network node 16 and the controlled entity 33 is comprised in a second network node 36, in a further particular embodiment an eNB. The split data flows 13 is transmitted over a network interface or transport channel from the first network node 16 to the second network node 36. Measures 39 of timing skews or quantities from which the timing skews can be deduced are transmitted uplinks from the controlled entity 33 to the controller entity 15 from the second network node 36 to the first network node 16.

Figure 7:
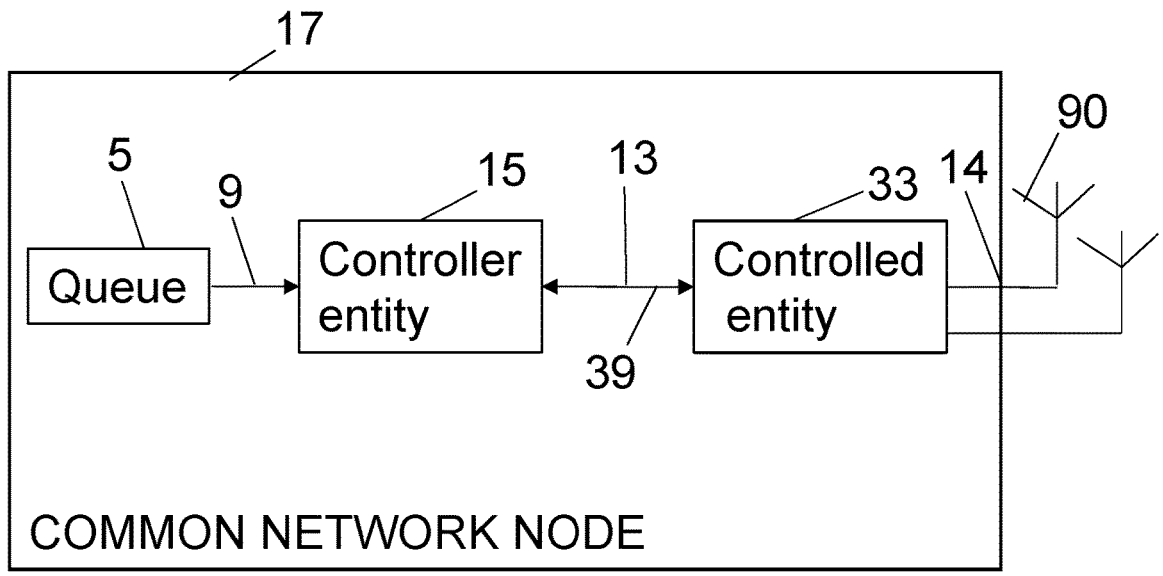
FIG. 7 illustrates schematically another embodiment of a wireless communication multipoint flow system.

FIG. 7 illustrates schematically another embodiment of a wireless communication multipoint data flow system. In this embodiment, both the controller entity 15 and the controlled entity 33 are comprised in the same common network node 17. The transmissions 13, 39 forth and back between the controller entity 15 and the controlled entity 33 are then internal node communications.

Figure 8:
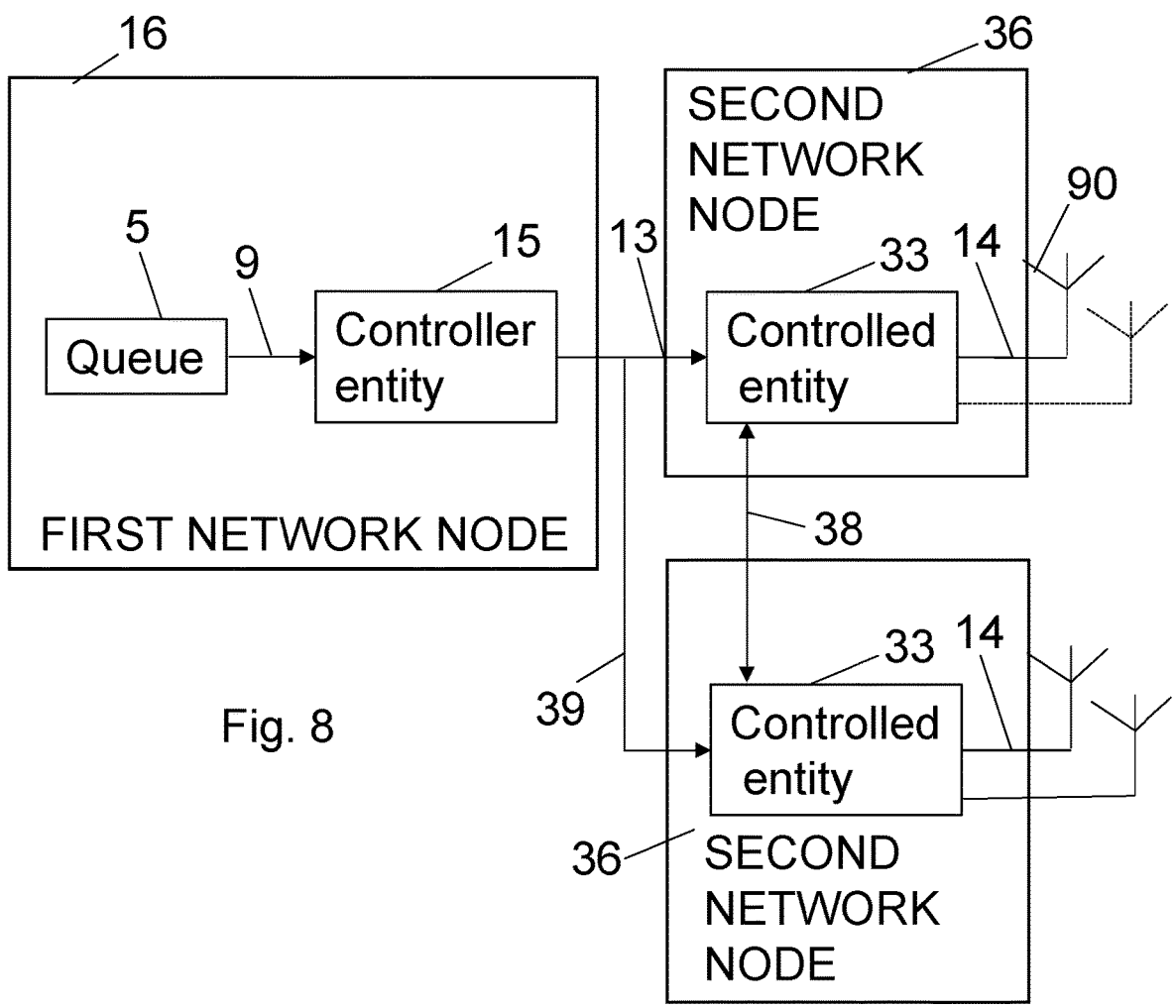
FIG. 8 illustrates schematically yet another embodiment of a wireless communication multipoint flow system.

FIG. 8 illustrates schematically yet another embodiment of a wireless communication multipoint data flow system. In this embodiment, the controller entity 15 is located in a first network node 16. In this embodiment, different controlled entities 33 are comprised in different second network nodes 36. Any communication between the controlled entities 33, e.g. exchange of average total delay or individual total downlink delays then is performed over network interfaces. In particular embodiment, X2 signaling 38 could be employed.

Anyone skilled in the art now realizes that there are numerous other possible scenarios of how the functionalities of the controller entity 15 and the controlled entity 33 can be realized. Depending on how easy the communication between the controlled entities 33 is, there are different preferred embodiments concerning what data that is communicated between the different nodes. If the communication between the controlled entities 33 is resource-demanding or slow, it might be of interest to move as much as possible the computation load to the common controller entity. In such embodiments, quantities from which timing skews can be deduced are transmitted from each controlled entity to the controller entity. Such quantities from which timing skews can be deduced comprises in one embodiment the total downlink delay for each of the wireless transmission points. In the controller entity, there is then a calculation of a mean total downlink delay for all wireless transmission points. Furthermore, timing skews for each of the wireless transmission points are also calculated as a difference between a respective total downlink delay and the mean total downlink delay.

In other embodiments, where the communication between the controlled entities is easy to achieve, e.g. if the controlled entities are comprised in a common network node, communication between the individual controlled entities may facilitate the computation of the timing skews. In such embodiment, the timing skew may therefore be computed in the controlled entity. The timing skew is, as mentioned above, the difference between the total downlink delay and a mean total downlink delay for all wireless transmission points that are controlled by the controller entity. The transmitting to the controller entity thereby comprises transmitting of the timing skew.

The mean total downlink delay for all transmission points that are controlled by the controller entity can be obtained in different ways. In one embodiment, the mean total downlink delay is simply received from another node or entity. This other node can e.g. be another controlled entity or an external entity.

If the mean total downlink delay is not directly available, the controlled entity receives in one embodiment total downlink delays for all other transmission points that are controlled by the controller entity. The mean total downlink delay for all transmission points that are controlled by the controller entity is then computed in the controlled entity.

If there are more controlled entities, they may share such computed mean total downlink delay. Therefore, in a particular embodiment, the computed mean total downlink delay for all transmission points that are controlled by the controller entity is transmitting to other controlled entities that are associated with a wireless transmission point among the transmission points that are controlled by the controller entity. In such a way, the computation of the mean total downlink delay does not have to be performed in every controlled entity.

Figure 9:
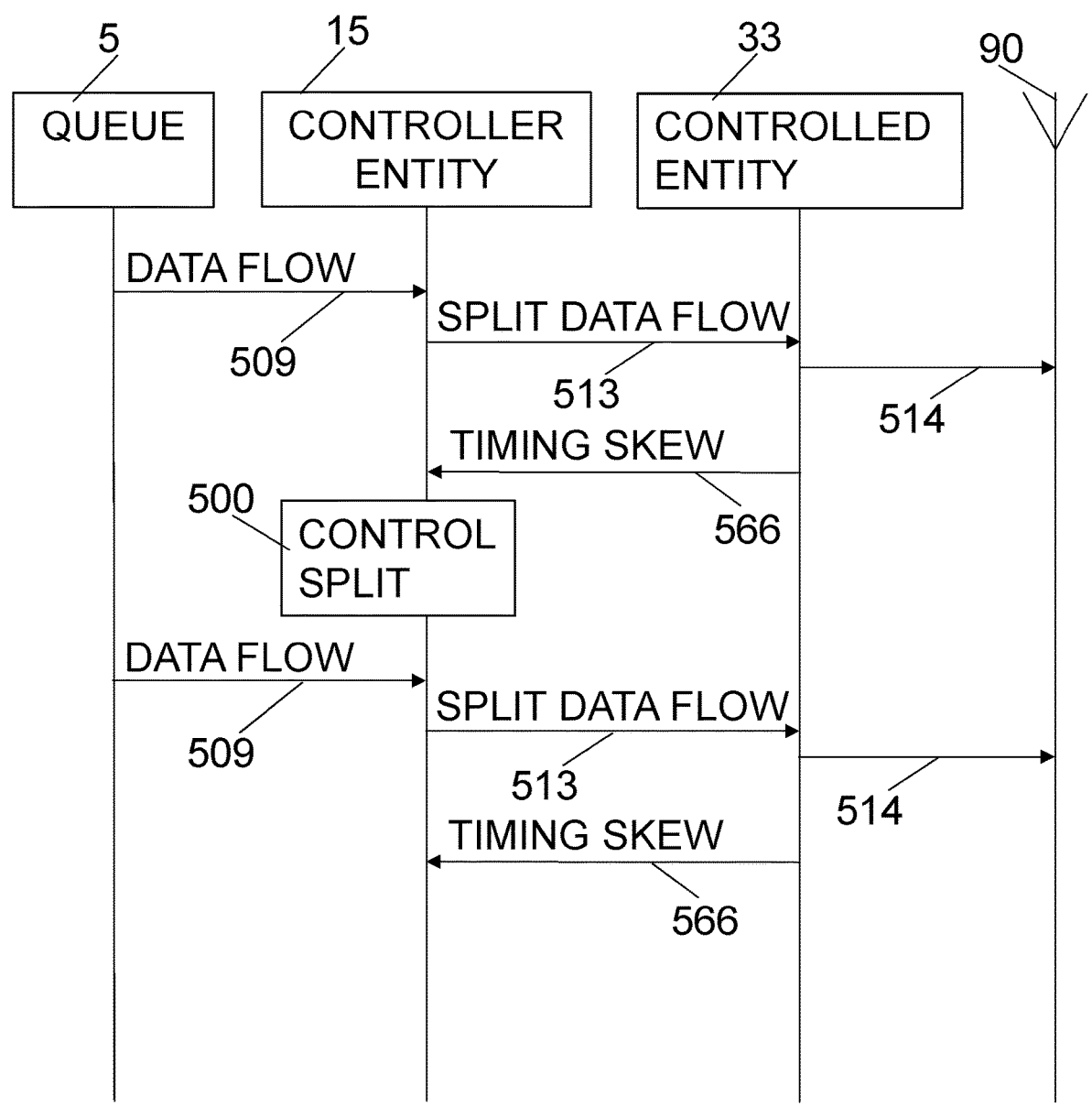
FIG. 9 illustrates schematically an embodiment of a signaling scheme for multipoint data flow control.

FIG. 9 illustrates schematically an embodiment of a signaling scheme for multipoint data flow control. A data flow is provided 509 from a queue 5 to a controller entity 15. The controller entity 15 splits the data flow 509 into split data flows that are transmitted 513 to controlled entities 33 for further wireless transmissions 514 from multiple transmission points. The controlled entities 33 perform measurements and provide 566 timing skews or quantities related thereto back to the controller entity 15. The controller entity 15 uses these measures to control 500 the splitting for subsequent data flows, so when a next data flow is to be forwarded, the splitting into split data flows are possibly performed according to updated conditions.

The present ideas may be implemented in a 3G, 4G or future 5G cellular system, or in a WIFI system, or in any other communication system where multi-point transmission of data flows is implemented.

The proposed technology provides a network node configured to control multipoint data flow in a wireless communication system, wherein the network node is configured to receive a data flow from a source flow queue, and to split the data flow into split data flows, for each of at least two wireless transmission points. The network node is further configured to receive measures of timing skews for transmissions from each of the transmission points or quantities from which the timing skews can be deduced and to control the splitting in dependence of the timing skews. The network node is further configured to transmit the split data flows to the at least two wireless transmission points.

In one particular embodiment, the network node is further configured to perform the controlling for minimizing an average absolute value of timing skew. In another particular embodiment, the network node is further configured to perform the controlling for keeping all individual timing skews within predetermined limits.

In one particular embodiment, the quantities from which the timing skews can be deduced are total downlink delay for each of the at least two wireless transmission points. The network node is then further configured to calculate a mean total downlink delay for all the at least two wireless transmission points, and the timing skews for each of the at least two wireless transmission points as a difference between a respective the total downlink delay and the mean total downlink delay.

In one particular embodiment, the network node is further configured to receive measures of queue lengths and bitrates of air interface transmissions for each of the at least two wireless transmission points and to control the data flow from the source flow based on at least the queue lengths and the bitrates of air interface transmissions.

The proposed technology also provides a network node configured to assist in controlling multipoint data flow in a wireless communication system. The network node is thereby configured to measure a total downlink delay for each of at least one wireless transmission point. The downlink delay comprises a network downlink delay from a controller entity and a queue delay for each of the at least one wireless transmission point. The network node is further configured to transmit the total downlink delay or quantities dependent thereon directly or indirectly to the controller entity.

In one particular embodiment, the network node is further configured to compute a timing skew. The timing skew is the difference between the total downlink delay and a mean total downlink delay for all transmission points being controlled by the controller entity. The network node is further configured to transmit the timing skew.

In one particular embodiment, the network node is further configured to receive the mean total downlink delay for all transmission points that are controlled by the controller entity.

In another particular embodiment, the network node is further configured to receive total downlink delays for all other transmission points that are controlled by the controller entity and to compute the mean total downlink delay for all transmission points that are controlled by the controller entity.

In one particular further embodiment, the network node is further configured to transmit the computed mean total downlink delay for all transmission points that are controlled by the controller entity to other controlled entities that are associated with a wireless transmission point among the transmission points that are controlled by the controller entity.

In another particular further embodiment, the network node is further configured to measure queue lengths and bitrates of air interface transmissions for the at least one wireless transmission point and to transmit the queue lengths and bitrates or quantities dependent thereon directly or indirectly to the controller entity.

In one particular embodiment, the network node is further configured to perform the transmitting of the queue lengths and bitrates or quantities dependent thereon by transmitting the queue lengths and bitrates directly or indirectly to the controller entity.

In another further embodiment, the network node is further configured to calculate a queue time from the queue lengths and bitrates for the at least one wireless transmission point. The network node is configured to perform the transmitting of the queue lengths and bitrates or quantities dependent thereon by transmitting the queue time directly or indirectly to the controller entity.

As used herein, the non-limiting term "network node" may refer to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

The network node may also include communication circuitry. The communication circuitry may include functions for wired and/or wireless communication with other devices and/or network nodes in the network. In a particular example, the network node may include radio circuitry for communication with one or more other nodes, including transmitting and/or receiving information. The communication circuitry may be interconnected to the processor and/or memory.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

In particular, the network node configured to control multipoint data flow in a wireless communication system comprises a processor and a memory, which memory comprises instructions executable by the processor, whereby the processor is operative to split the data flow into split data flows, for each of at least two wireless transmission points, and to control the splitting in dependence of the timing skews.

In particular, the network node configured to assist in controlling multipoint data flow in a wireless communication system comprises a processor and a memory, which memory comprises instructions executable by the processor, whereby the processor is operative to measure a total downlink delay for each of at least one wireless transmission point.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In particular, the network node configured to control multipoint data flow in a wireless communication system, comprises communication circuitry configured to receive a data flow from a source flow queue, to transmit the split data flows to the at least two wireless transmission points, and to receive measures of timing skews for transmissions from each of the transmission points or quantities from which the timing skews can be deduced.

Figure 10:
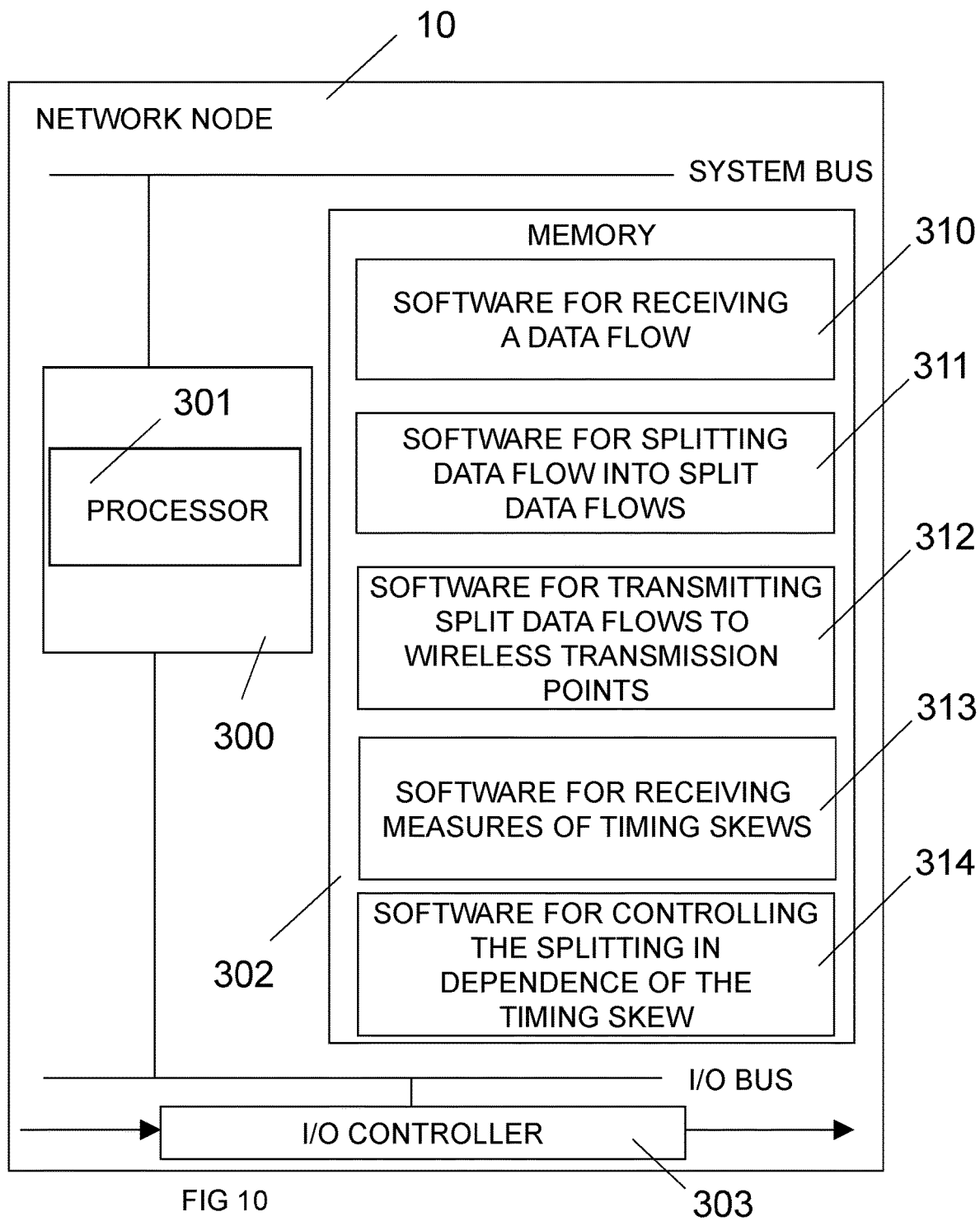
FIG. 10 is a schematic block diagram illustrating an embodiment of a network node for multipoint data flow control.

FIG. 10 is a schematic block diagram illustrating an example of a network node 10 comprising a processor 301 and an associated memory 302. In this particular example, at least some of the steps, functions, procedures, modules and/or blocks described herein are implemented in a computer program, which is loaded into the memory for execution by processing circuitry including one or more processors. In this particular embodiment, the memory 302 comprises software 310 for receiving a data flow, software 311 for splitting the data flow into split data flows, software 312 for transmitting split data flows to wireless transmission points, software 313 for receiving measures of timing skews and software 314 for controlling the splitting in dependence of the timing skew. The processor(s) and memory are interconnected to each other to enable normal software execution. In this embodiment, such an interconnection is provided by a system bus. An input/output device, in this embodiment an I/O bus and an I/O controller 303, may also be interconnected to the processor(s) and/or the memory to enable input and/or output of relevant data such as input parameter(s) and/or resulting output parameter(s).

Also in particular, the network node configured to assist in controlling multipoint data flow in a wireless communication system comprises communication circuitry configured to transmit the total downlink delay or quantities dependent thereon directly or indirectly to the controller entity.

Figure 11:
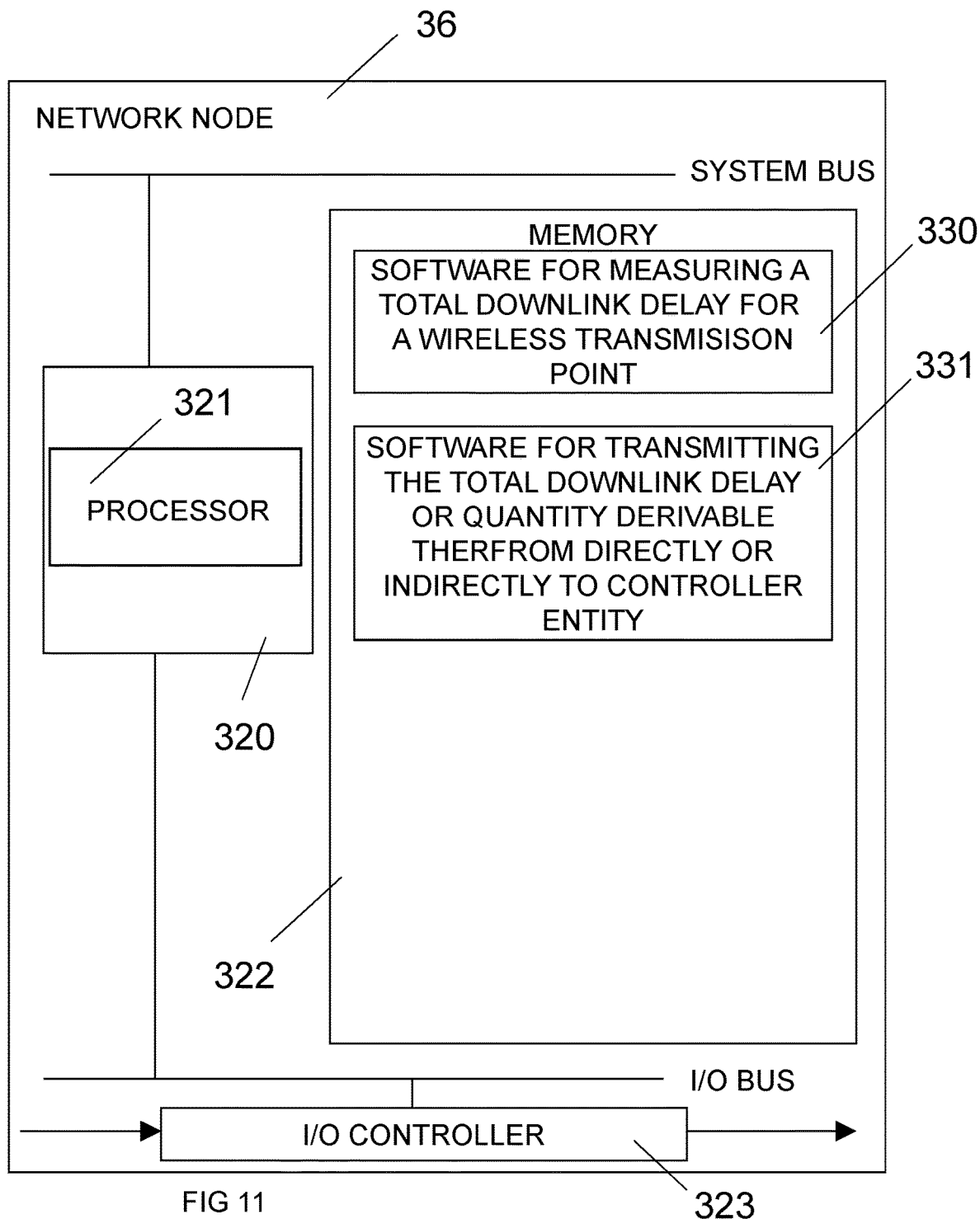
FIG. 11 is a schematic block diagram illustrating an embodiment of a network node for assisting in multipoint data flow control.

FIG. 11 is a schematic block diagram illustrating an example of a network node 36 comprising a processor 321 and an associated memory 322. In this particular example, at least some of the steps, functions, procedures, modules and/or blocks described herein are implemented in a computer program, which is loaded into the memory for execution by processing circuitry including one or more processors. In this particular embodiment, the memory 322 comprises software 330 for measuring a total downlink delay for a wireless transmission point and software 331 for transmitting the total downlink delay or quantity derivable therefrom directly or indirectly to controller entity. The processor(s) and memory are interconnected to each other to enable normal software execution. In this embodiment, such an interconnection is provided by a system bus. An input/output device, in this embodiment an I/O bus and an I/O controller 323, may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program comprises instructions, which when executed by at least one processor, cause the processor(s) to receive a data flow from a source flow queue, to split the data flow into split data flows, for each of at least two wireless transmission points, to transmit the split data flows to the at least two wireless transmission points, to receive measures of timing skews for transmissions from each of the transmission points or quantities from which the timing skews can be deduced, and to control the splitting in dependence of said timing skews.

In another particular embodiment, the computer program comprises instructions, which when executed by at least one processor, cause the processor(s) to measure a total downlink delay for each of at least one wireless transmission point, which downlink delay comprises a network downlink delay from a controller entity and a queue delay for each of the at least one wireless transmission point, and to transmit the total downlink delay or quantities dependent thereon directly or indirectly to the controller entity.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding network node may be defined as a group of function modules, where each step performed by the processor corresponds to a function module. In this case, the function modules are implemented as a computer program running on the processor. Hence, the network node may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in Figure Y.

Figure 12:
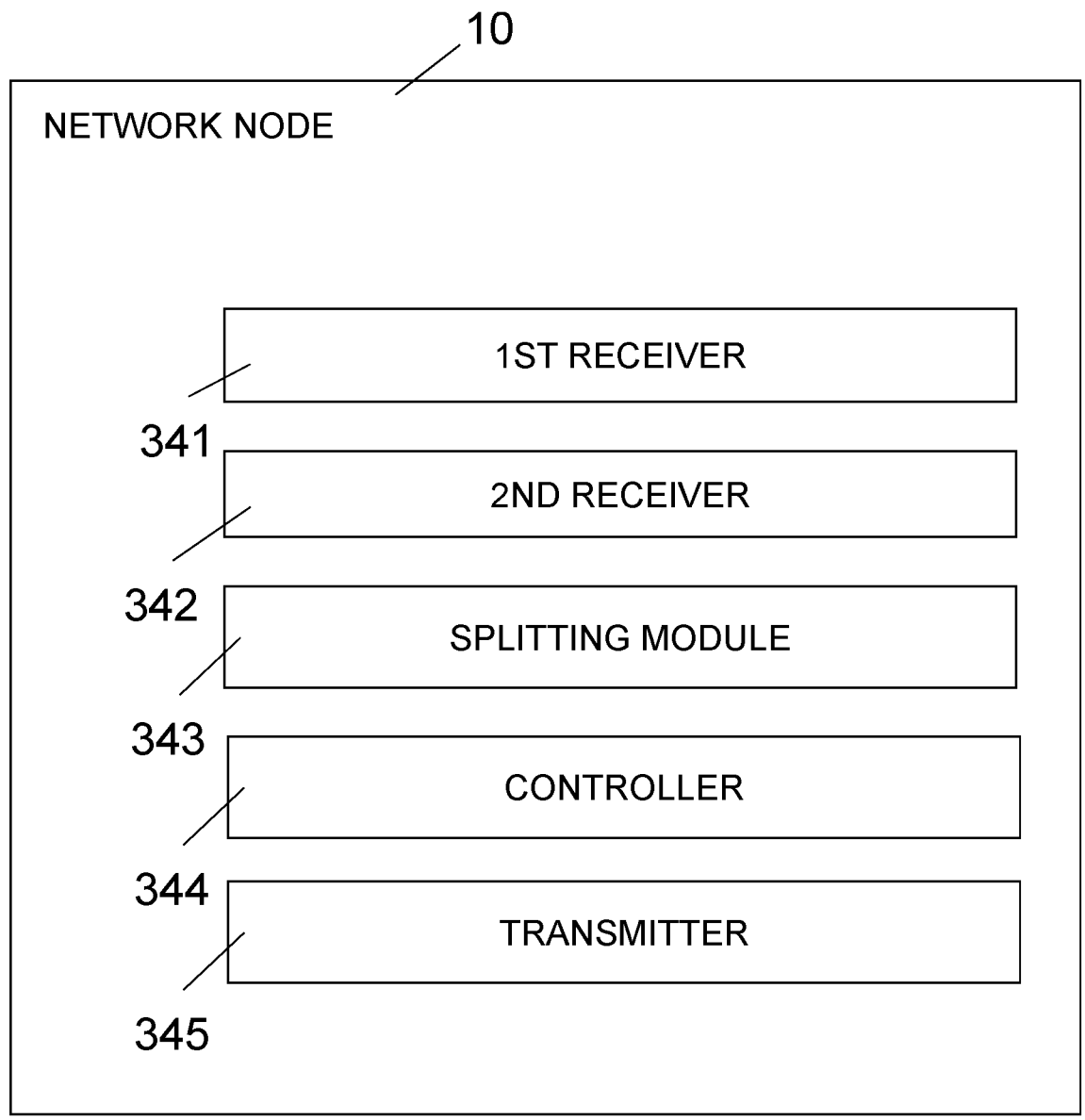
FIG. 12 is a schematic block diagram illustrating an embodiment of a network node for multipoint data flow control.

FIG. 12 is a schematic block diagram illustrating an example of a network node 10 comprising a group of function modules. The network node 10 comprises a first receiver 341 for receiving a data flow from a source flow queue, a splitting module 343 for splitting the data flow into split data flows, for each of at least two wireless transmission points, a transmitter 345 for transmitting the split data flows to the at least two wireless transmission points, a second receiver 342 for receiving measures of timing skews for transmissions from each of the transmission points or quantities from which the timing skews can be deduced, and a controller 344 for controlling the splitting in dependence of the timing skews.

Figure 13:
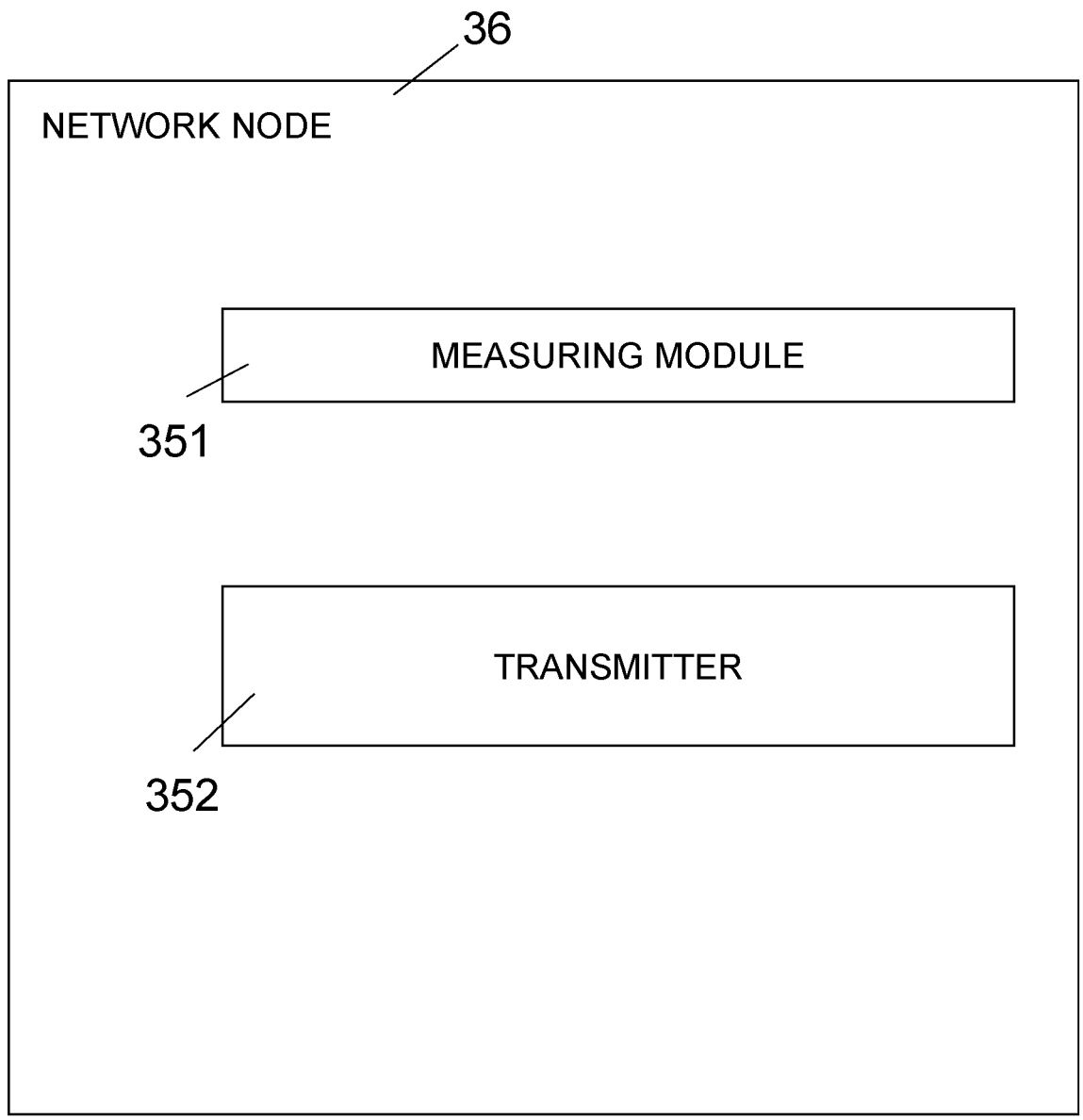
FIG. 13 is a schematic block diagram illustrating an embodiment of a network node for assisting in multipoint data flow control.

FIG. 13 is a schematic block diagram illustrating an example of a network node 10 comprising a group of function modules. The network node comprises a measuring module 351 for measuring a total downlink delay for each of at least one wireless transmission point, which downlink delay comprises a network downlink delay from a controller entity and a queue delay for each of the at least one wireless transmission point, and a transmitter 352 for transmitting the total downlink delay or quantities dependent thereon directly or indirectly to the controller entity, to assist in multipoint flow control by the controller entity.

Alternatively it is possibly to realize the modules in FIGS. 12 and 13 predominantly by hardware modules, or alternatively by hardware. The extent of software versus hardware is purely implementation selection.

The here is presented technology outlines in different embodiment new techniques to measure timing skew in multiflow systems, to use feedback control to control the skew, to use feed-forward control to control the skew and to maintain optimal data flow in the multi-point transmit system.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Abbreviations 3G 3rd Generation cellular system
4G 4th Generation cellular system
5G 5th Generation cellular system
ASIC Application Specific Integrated Circuit
BTS Base Transceiver Station
CD Compact Disc
CN Core Network
CPU Central Processing Unit
DSP Digital Signal Processor
DVD Digital Versatile Disc
eNB Evolved universal terrestrial radio access network Node B
FPGA Field Programmable Gate Array
HDD Hard Disk Drive
LTE Long-Term Evolution
PLC Programmable Logic Controllers
RAM Random Access Memory
RAN Radio Access Network
RBS Radio Base Station
RNC Radio Network Controller
ROM Read-Only Memory
RRU Remote Radio Units,
TCP Transmission Control Protocol
UE User Equipment
USB Universal Serial Bus
WCDMA Wideband Code-Division Multiple Access

The invention claimed is:

1. A method, performed in a controller entity of a wireless communication system, for multipoint data flow control, wherein said method comprises the steps of:
receiving a data flow from a source flow queue;
splitting said data flow into split data flows, for each of at least two wireless transmission points;
transmitting said split data flows to said at least two wireless transmission points;
receiving measures from each one of said at least two transmission points of timing skews for transmissions from the controller entity to the one of said at least two transmission points or receiving quantities from which measures of timing skews can be deduced and deducing said measures of timing skews, wherein said quantities from which said measures of timing skews can be deduced are a total downlink delay for each of said at least two wireless transmission points, wherein the timing skew for the one of the said at least two transmission points comprises a difference between the total downlink delay for the one of said at least two transmission points and a mean total downlink delay for the at least two transmission points, wherein deducing said measures of timing skews comprises:
calculating the mean total downlink delay for all said at least two wireless transmission points and the total downlink delay for each of said at least two wireless transmission points, wherein the mean total downlink delay comprises a network downlink delay from the controller entity and a queue delay for all said at least two wireless transmission points and the total downlink delay for one of the said at least two wireless transmission points comprises the network downlink delay and a queue delay for the one of the said at least two wireless transmission points; and
deducing said measures of timing skews for each of said at least two wireless transmission points as a difference between a respective said total downlink delay and said mean total downlink delay; and
controlling said splitting in dependence of said timing skews by performing one of minimizing an average absolute value of timing skew or keeping all individual timing skews within predetermined limits.

2. The method according to claim 1, comprising the further steps of:
receiving measures of queue lengths and bitrates of air interface transmissions for at least one of said at least two wireless transmission points; and
controlling said data flow from said source flow based on at least said queue lengths and said bitrates of air interface transmissions.

3. A network node configured to control multipoint data flow in a wireless communication system, the network node comprising:
processing circuitry; and
memory coupled with the processing circuitry, wherein the memory includes instructions that when executed by the processing circuitry causes the network node:
to receive a data flow from a source flow queue;
to split said data flow into split data flows, for each of at least two wireless transmission points;
to transmit said split data flows to said at least two wireless transmission points;
to receive measures from each one of said at least two transmission points of timing skews for transmissions from the controller entity to the one of said at least two transmission points or receive quantities from which measures of timing skews can be deduced and deduce said measures of timing skews, wherein said quantities from which said measures of timing skews can be deduced are a total downlink delay for each of said at least two wireless transmission points, wherein the timing skew for the one of the said at least two transmission points comprises a difference between the total downlink delay for the one of said at least two transmission points and a mean total downlink delay for the at least two transmission points, wherein to deduce said measures of timing skews, the network node is configured to:
calculate the mean total downlink delay for all said at least two wireless transmission points and the total downlink delay for each of said at least two wireless transmission points, wherein the mean total downlink delay comprises a network downlink delay from the controller entity and a queue delay for all said at least two wireless transmission points and the total downlink delay for one of the said at least two wireless transmission points comprises the network downlink delay and a queue delay for the one of the said at least two wireless transmission points; and
deduce said measures of timing skews for each of said at least two wireless transmission points as a difference between a respective said total downlink delay and said mean total downlink delay; and
to control said splitting in dependence of said timing skews by performing one of minimizing an average absolute value of timing skew or keeping all individual timing skews within predetermined limits.

4. The network node according to claim 3, wherein the network node comprises a processor and a memory, said memory comprising instructions executable by the processor, whereby the processor is operative to split said data flow into split data flows, for each of at least two wireless transmission points, and to control said splitting in dependence of said timing skews.

5. The network node according to claim 3, wherein the network node comprises communication circuitry configured to receive a data flow from a source flow queue, to transmit split data flows to said at least two wireless transmission points, and to receive measures of timing skews for transmissions from each of said at least two wireless transmission points or quantities from which said timing skews can be deduced.

6. The network node according to claim 3, wherein the network node is further configured to:
calculate a mean total downlink delay for all said at least two wireless transmission points, and deducing said measures of timing skews for each of said at least two wireless transmission points as a difference between a respective said total downlink delay and said mean total downlink delay.

7. The network node according to claim 3, wherein the network node is further configured:
to receive measures of queue lengths and bitrates of air interface transmissions for each of said at least two wireless transmission points; and
to control said data flow from said source flow based on at least said queue lengths and said bitrates of air interface transmissions.

* * * * *